United States Patent
Park et al.

(10) Patent No.: US 9,496,796 B2
(45) Date of Patent: Nov. 15, 2016

(54) MULTI-OUTPUT POWER SUPPLY APPARATUS AND OUTPUT CIRCUIT THEREOF

(71) Applicant: SOLUM CO., LTD., Suwon-si (KR)

(72) Inventors: Sang Gab Park, Suwon-Si (KR); Hong Sun Park, Suwon-Si (KR); Dong Kyun Ryu, Suwon-Si (KR); Hyun Seo Park, Suwon-Si (KR); Sang In Jang, Suwon-Si (KR)

(73) Assignee: SOLUM CO., LTD, Suwon-si (KR)

( * ) Notice: Subject to any disclaimer, the term of this patent is extended or adjusted under 35 U.S.C. 154(b) by 0 days.

(21) Appl. No.: 14/612,240

(22) Filed: Feb. 2, 2015

(65) Prior Publication Data

US 2016/0006361 A1 Jan. 7, 2016

(30) Foreign Application Priority Data

Jul. 2, 2014 (KR) .................. 10-2014-0082404

(51) Int. Cl.
| | |
|---|---|
| H02M 3/28 | (2006.01) |
| H02M 3/335 | (2006.01) |
| H05B 37/02 | (2006.01) |
| H02M 1/42 | (2007.01) |
| H02M 3/337 | (2006.01) |

(52) U.S. Cl.
CPC ....... *H02M 3/33546* (2013.01); *H02M 1/4208* (2013.01); *H02M 3/337* (2013.01); *H02M 3/33561* (2013.01); *H05B 37/02* (2013.01)

(58) Field of Classification Search
CPC .................. H02M 3/33546; H05B 37/02
See application file for complete search history.

(56) References Cited

U.S. PATENT DOCUMENTS

| | | | | |
|---|---|---|---|---|
| 4,559,590 A | * | 12/1985 | Davidson .......... | H02M 3/33569 363/133 |
| 4,709,316 A | * | 11/1987 | Ngo .................. | H02M 3/33546 363/21.03 |
| 6,072,709 A | * | 6/2000 | Raets ................ | H02M 3/28 307/28 |
| 8,665,613 B2 | * | 3/2014 | Degen ............... | H02M 3/33523 363/21.06 |
| 2007/0138870 A1 | * | 6/2007 | Kyono ............... | H02M 3/3353 307/17 |
| 2008/0309162 A1 | * | 12/2008 | Ma ................... | H02M 3/24 307/31 |
| 2010/0220504 A1 | * | 9/2010 | Kim .................. | H02M 3/33507 363/21.17 |
| 2011/0234111 A1 | * | 9/2011 | Han .................. | H05B 33/0818 315/186 |
| 2012/0007512 A1 | * | 1/2012 | Kim .................. | H05B 33/0827 315/152 |
| 2012/0163038 A1 | * | 6/2012 | Park ................. | H02M 3/338 363/21.02 |
| 2013/0169180 A1 | * | 7/2013 | Park ................. | H05B 33/0896 315/206 |
| 2015/0117070 A1 | * | 4/2015 | Wang ............... | H02M 3/33561 363/21.14 |

FOREIGN PATENT DOCUMENTS

| | | | | |
|---|---|---|---|---|
| CN | 202190214 U | * | 4/2012 | ............... G09G 3/36 |
| JP | 2011-101516 A | | 5/2011 | |
| KR | 10-0523378 B1 | | 10/2005 | |

* cited by examiner

*Primary Examiner* — Jason M Crawford
*Assistant Examiner* — Kurtis R Bahr
(74) *Attorney, Agent, or Firm* — Sughrue Mion, PLLC

(57) ABSTRACT

A multi-output power supply apparatus may include a transformer unit transforming a voltage level of input power using a primary winding and first and second secondary windings, a first output unit stabilizing power applied to the first secondary winding using a voltage multiplier circuit and outputting first power, and a second output unit stabilizing power applied to the second secondary winding and outputting second power.

10 Claims, 4 Drawing Sheets

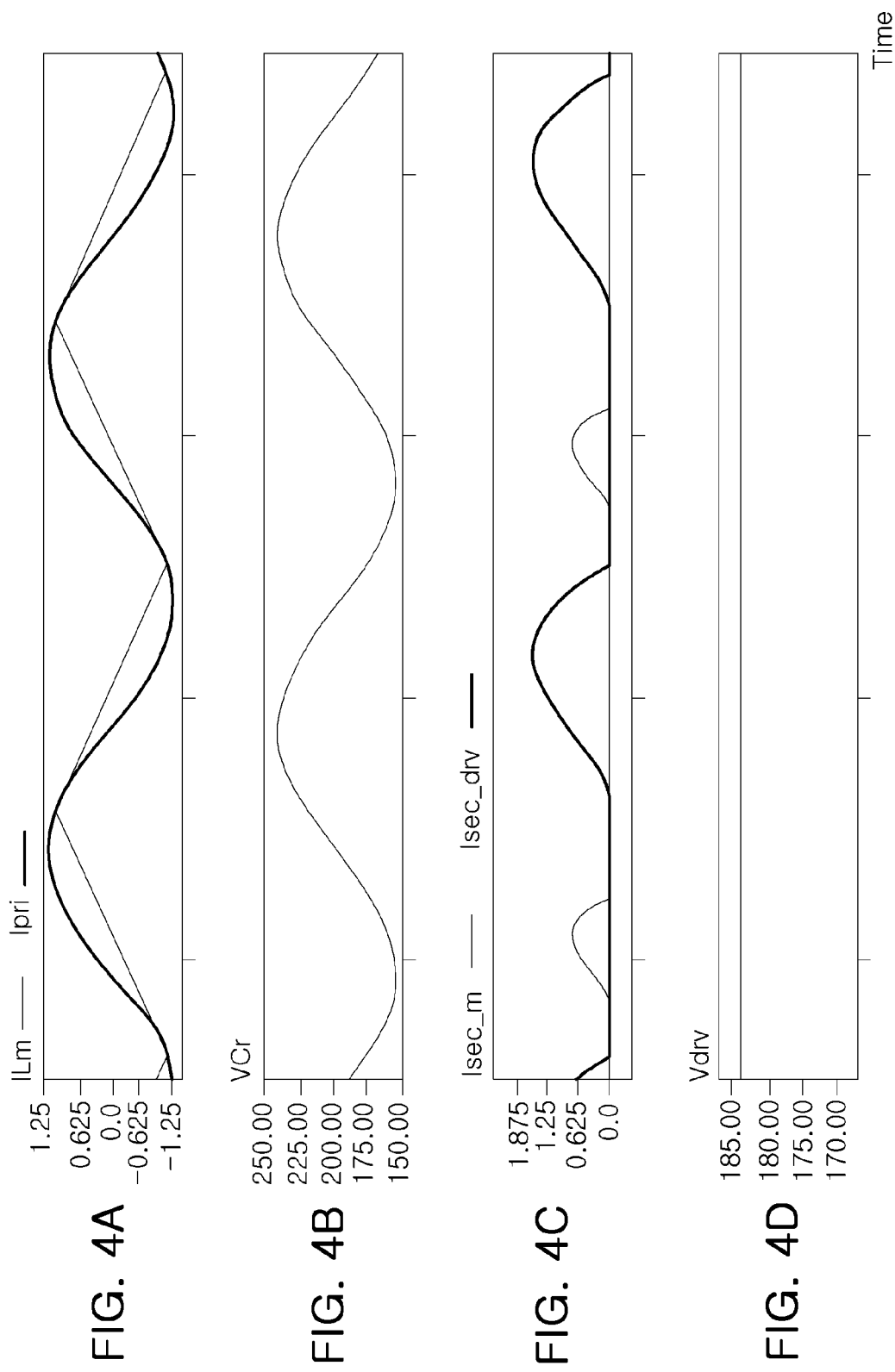

MULTI-OUTPUT POWER SUPPLY APPARATUS AND OUTPUT CIRCUIT THEREOF

CROSS-REFERENCE TO RELATED APPLICATION

This application claims the priority and benefit of Korean Patent Application No. 10-2014-0082404, filed on Jul. 2, 2014, with the Korean Intellectual Property Office, the disclosure of which is incorporated in its entirety herein by reference.

BACKGROUND

Some embodiments of the present disclosure may relate to a multi-output power supply apparatus and an output circuit thereof.

A power supply apparatus may provide a plurality of output voltages depending on an electronic product where it is employed.

A general multi-output power supply apparatus converts input power into a plurality of alternating current (AC) voltages through a transformer and rectifies the plurality of AC voltages to output a plurality of direct current (DC) voltages.

However, in the general multi-output power supply apparatus, when a voltage level of one of the plurality of DC voltages is varied by the transformer, the voltage having the varied voltage level has an influence on other DC voltages.

An example of a multi-output power supply apparatus including an image voltage and a backlight unit voltage will hereinafter be described. The multi-output power supply apparatus may perform a controlling operation based on a feedback from the secondary side image voltage of the transformer. When a load of the image voltage is decreased, a resonant frequency may be increased, such that a voltage swing width of a primary side resonant capacitor is narrowed. Therefore, the input voltage of the transformer may drop.

In addition, since the number of secondary side windings is determined depending on an input voltage of the backlight unit, when a high input voltage is required in the backlight unit, leakage inductance may be increased.

Therefore, when the load of the image voltage is decreased in a circuit having a large amount of leakage inductance as described above, power from the transformer may be decreased due to the input voltage drop, such that a large voltage drop may occur in the backlight unit voltage, that is, cross-regulation may be increased.

In addition, such a voltage drop due to the cross-regulation may have an influence on a dimming pulse, such that it may be difficult to accurately control dimming.

Patent Document 1 relates to a power supply apparatus for a plasma display panel (PDP), and Patent Document 2 relates to a multi-output switching power apparatus.

RELATED ART DOCUMENT (Patent Document 1) Korean Patent No. 10-0523378
(Patent Document 2) Japanese Patent Laid-Open Publication No. 2011-101516

SUMMARY

An aspect of the present disclosure may provide a multi-output power supply apparatus capable of decreasing an influence of variations in an output load on other output loads even in the case that the output load of any one of multiple outputs is decreased.

According to an aspect of the present disclosure, a multi-output power supply apparatus may include: a transformer unit including a primary winding, a first secondary winding and a second secondary winding, and transforming input power to first output power and second output power; a first output unit including a voltage multiplier circuit to stabilize power applied to the first secondary winding, and outputting the first output power; and a second output unit stabilizing power applied to the second secondary winding and outputting the second output power.

According to another aspect of the present disclosure, a multi-output power supply apparatus may include: a transformer unit including a primary winding and a plurality of secondary windings and transforming input power to first output power and second output power; a first output unit including a voltage multiplier circuit to stabilize power applied to at least one of the plurality of secondary winding and outputting first output power; and a second output unit stabilizing power applied to some or the others of the plurality of secondary windings and outputting the second powers.

According to another aspect of the present disclosure, an output circuit of a multi-output power supply apparatus connected to a secondary winding of a transformer of the multi-output power supply apparatus may include: a first closed circuit including the secondary winding of the transformer of the multi-output power supply apparatus and a voltage multiplier circuit; and a second closed circuit including the secondary winding, an output switch, and an output capacitor.

BRIEF DESCRIPTION OF DRAWINGS

The above and other aspects, features and other advantages of the present disclosure will be more clearly understood from the following detailed description taken in conjunction with the accompanying drawings, in which:

FIG. 4A-4D are graphs illustrating waveforms of the multi-output power supply apparatus according to an exemplary embodiment of the present disclosure.

DETAILED DESCRIPTION

Figure 1:
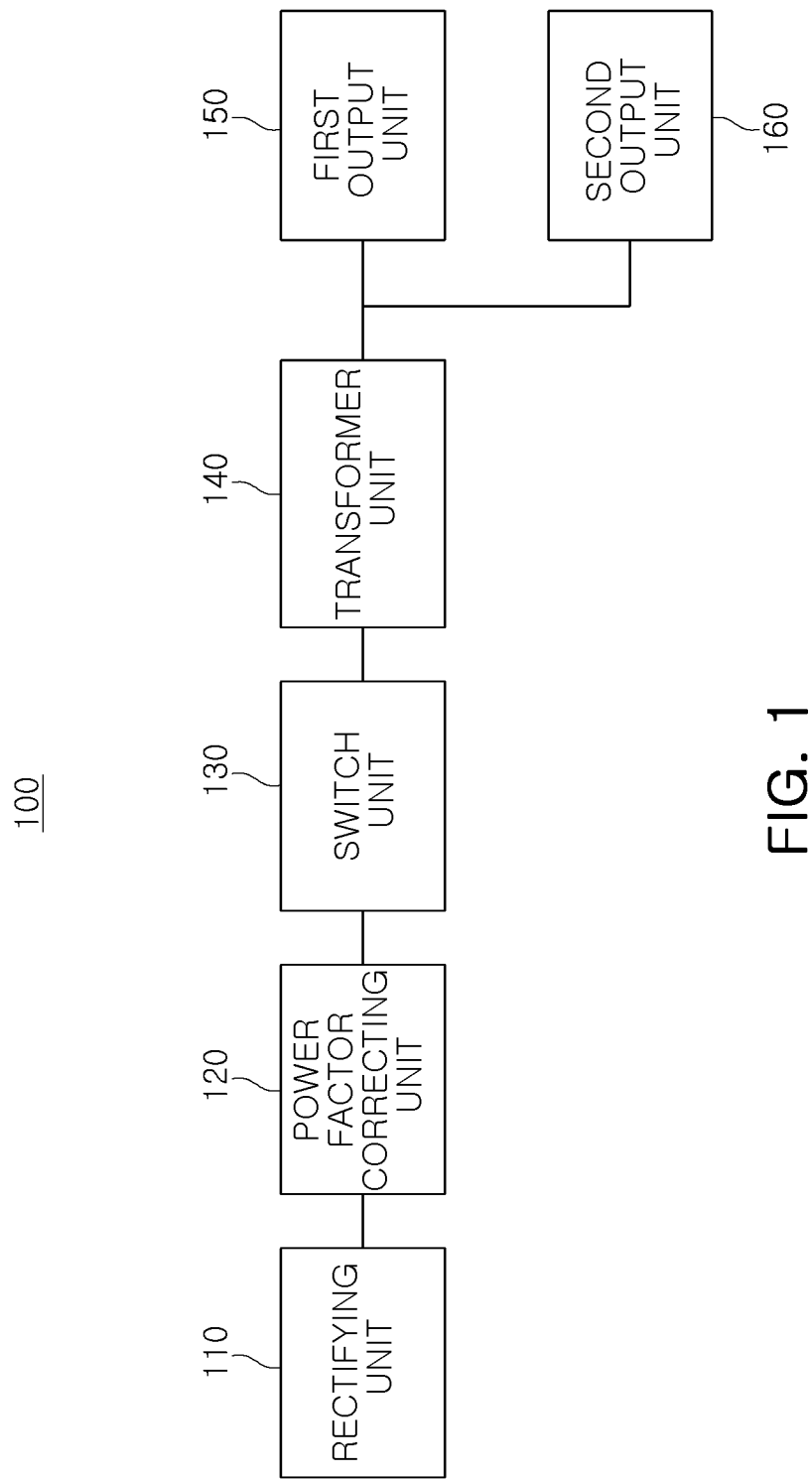
FIG. 1 is a configuration diagram illustrating a multi-output power supply apparatus according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Throughout the drawings, the same or like reference numerals will be used to designate the same or like elements.

FIG. 1 is a configuration diagram illustrating a multi-output power supply apparatus according to an exemplary embodiment of the present disclosure.

Referring to FIG. 1, a multi-output power supply apparatus 100 according to an exemplary embodiment of the present disclosure may include a switch unit 130, a transformer unit 140, a first output unit 150, and a second output unit 160. According to the exemplary embodiment, the multi-output power supply apparatus 100 may further include a rectifying unit 110 or a power factor correcting unit 120.

The rectifying unit 110 may rectify an input alternating current (AC) voltage and transfer the rectified AC voltage to the power factor correcting unit 120. According to an exemplary embodiment, the rectifying unit 110 may further include, for instance, but not limited to, a smoothing circuit to rectify and smooth the input AC voltage.

The power factor correcting unit 120 may correct a power factor, for example, by adjusting a phase difference between a voltage and a current of the power rectified from the rectifying unit 110, but not limited thereto. The power factor correcting unit 120 may also correct the power factor by adjusting a current waveform of the rectified voltage so as to conform to a voltage waveform.

The switch unit 130 may perform a switching operation on the input AC voltage to allow the multi-output power supply apparatus 100 to perform power conversion. The switch unit 130 may include a plurality of switches connected in series with each other and perform an alternate or sequential switching operation on the plurality of switches.

The transformer unit 140 may transform a voltage level of the input AC voltage, for example, but not limited to, using a primary winding and a plurality of secondary windings. The transformer unit 140 may perform transformation by the switching operation of the switch unit 130.

The transformer unit 140 may induce a power from the primary winding to the plurality of secondary windings using a magnetic induction scheme. A voltage of the induced power may be transformed depending on a turns ratio between the primary winding and the secondary winding.

The plurality of secondary windings of the transformer unit 140 may provide AC voltages to a plurality of output units, respectively.

The output units 150 and 160 may stabilize the power applied to the secondary windings of the transformer unit 140.

In various exemplary embodiments of the present disclosure to be described below, the first output unit 150 and the second output unit 160 will be separately described depending on whether or not a voltage multiplier circuit is included therein. For example, the first output unit 150 may include the voltage multiplier circuit, and the second output unit 160 may not include the voltage multiplier circuit. Although the second output unit 160 will be described as one component, the multi-output power supply apparatus may include a plurality of output circuits each connected to the plurality of secondary windings of the transformer unit 140, according to an exemplary embodiment.

Figure 2:
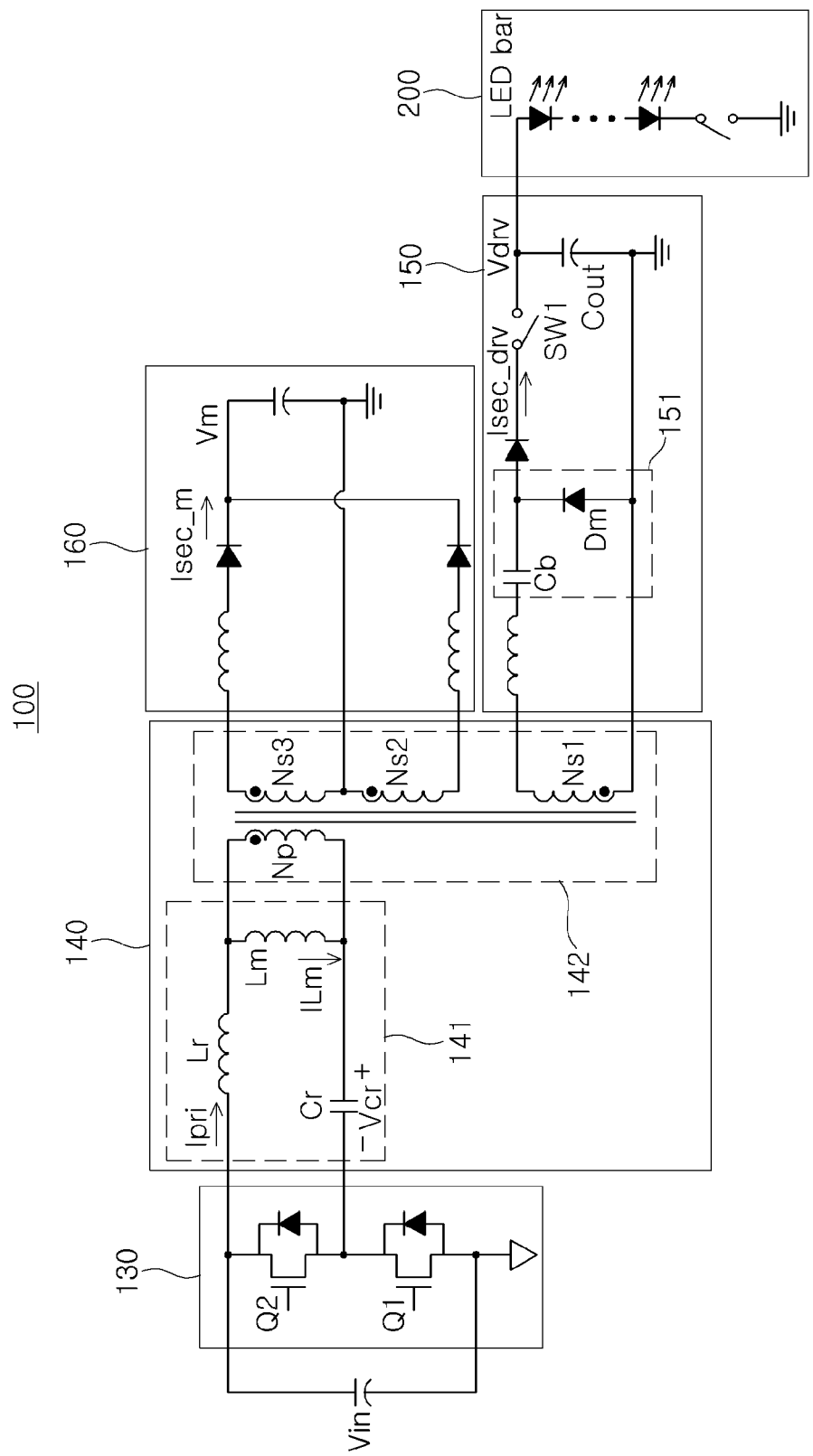
FIG. 2 is a circuit diagram of the multi-output power supply apparatus of FIG. 1.

FIG. 2 is a circuit diagram of the multi-output power supply apparatus of FIG. 1. Hereinafter, an embodiment of an operation and a circuit configuration of the multi-output power supply apparatus will be described in more detail with reference to FIG. 2.

The switch unit 130 may include at least two switches stacked between an input power terminal, to which a DC power Vin is input, and a ground. In the example illustrated in FIG. 2, the switch unit 130 may include a pair of switches Q1 and Q2 and perform a power conversion operation by an alternate switching operation of first and second switches Q1 and Q2.

The transformer unit 140 may include a resonant tank 141 and a transformer 142.

The resonant tank 141 may be configured of, for instance, but not limited to, an inductor-capacitor (LC) resonant circuit or an inductor-inductor-capacitor (LLC) resonant circuit. In the example illustrated in FIG. 2, the resonant tank 141 may be configured of an inductor Lr, an inductor Lm, and a capacitor Cr. The inductor Lm may be a magnetizing inductor of the transformer 142.

The transformer 142 may include a primary winding Np and a plurality of secondary windings Ns1, Ns2, and Ns3. The primary winding Np and the plurality of secondary windings Ns1, Ns2, and Ns3 may be magnetically coupled to each other. That is, the primary winding Np and the plurality of secondary windings Ns1, Ns2, and Ns3 may be electrically spaced apart from each other.

The primary winding Np and the secondary windings Ns1, Ns2, and Ns3 may have a preset turns ratio therebetween. For example, a first secondary winding Ns1 may have a first turns ratio with respect to the primary winding Np, and a second secondary winding Ns2 may have a second turns ratio with respect to the primary winding Np.

The secondary windings Ns1, Ns2, and Ns3 may output voltages having voltage levels determined by applying the turns ratios to the primary winding Np to the voltage input.

Among the plurality of secondary windings Ns1, Ns2 and Ns3 of the transformer 142, the first secondary winding Ns1 connected to the first output unit 150 including a voltage multiplier circuit 151 to be described below may have a turns amount determined depending on a multiplying number of the voltage multiplier circuit 151. That is, as the multiplying number of the voltage multiplier circuit 151 is increased, the first secondary winding Ns1 having a smaller turns amount may be applied to the first output unit 150. In the embodiment in which the voltage multiplier circuit 151 is not used, if the first secondary winding Ns1 has a turns amount of n, when the voltage multiplier circuit 151 has a multiplying number of two, the turns amount of the first secondary winding Ns1 may be determined to be n/2. The voltage multiplier circuit 151 and the first secondary winding Ns1 will be described in more detail in the following description for the first output unit 150.

The first and second output units 150 and 160 may stabilize each of the voltages from the plurality of secondary windings Ns1, Ns2, and Ns3 and output a plurality of DC voltages Vm and Vdrv. For instance, the output units 150 and 160 may be configured of separate independent circuit units, hereinafter output circuits, but not limited thereto.

The first output unit 150 may include a balance capacitor Cb, an output switch SW1 and a multiplier diode Dm. The balance capacitor Cb may be connected in series with one end of the first secondary winding Ns1. The output switch SW1 may be disposed between the balance capacitor Cb and an output node of the first output unit 150. The multiplier diode Dm may have one end connected to a connection terminal positioned between the balance capacitor Cb and the output switch SW1 and the other end connected to the other end of the first secondary winding Ns1.

The balance capacitor Cb and the multiplier diode Dm may configure the voltage multiplier circuit 151. Although the voltage multiplier circuit 151 having a multiplying number of 2 has been illustrated in FIG. 2 as an example, it will be obvious that voltage multiplier circuits 151 having various multiplying numbers may be used according to this and other exemplary embodiments.

Since the voltage multiplier circuit 151 may be used in the first output unit 150, a turns amount of the first secondary winding Ns1 of the transformer 142 connected to the first output unit 150 may be decreased as compared with the case in which the voltage multiplier circuit 151 is not present. In the case in which the voltage multiplier circuit 151 having the multiplying number of 2 is used as illustrated in FIG. 2, the first secondary winding Ns1 may have a turns amount of n/2 (here, n indicates a turns amount in the case in which the voltage multiplier circuit is not present), as described above.

As described above, in the present embodiment, the turns amount of the first secondary winding Ns1 may be decreased, such that a leakage inductance due to the first secondary winding Ns1 may be decreased. Since the leakage inductance is decreased, even in the case in which a small load is applied to another output unit 160, the first output unit 150 may stably provide a sufficient output.

In the example illustrated in FIG. 2, the first output unit 150 may provide power to a load, for example, but not limited to, a light emitting diode (LED) backlight unit 200. Therefore, due to these characteristics of the first output unit 150, the first output unit 150 may stably supply the power to the backlight unit 200. Since the power is stably supplied to the backlight unit 200 as described above, the backlight unit 200 may perform an accurate dimming control.

For instance, the first output unit 150 may include two closed circuits. The first output unit 150 may include a first closed circuit including the secondary winding Ns1 of the transformer 142 and the voltage multiplier circuit 151 and a second closed circuit including the secondary winding Ns1, the output switch SW1, and an output capacitor Cout.

Figure 3:
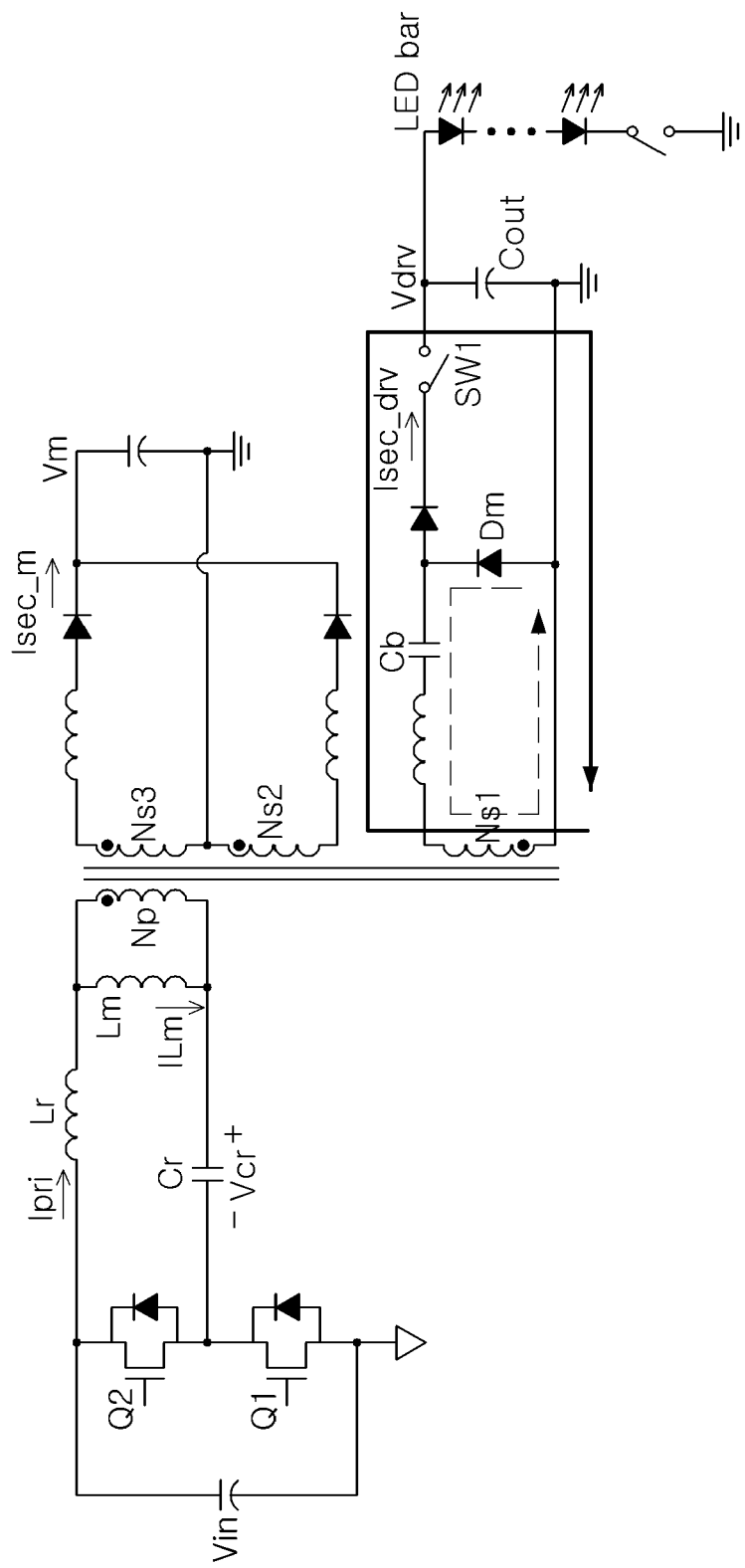
FIG. 3 is a reference view for describing an operation of an output circuit of the multi-output power supply apparatus.

As illustrated in FIG. 3, the first closed circuit (denoted by a dotted line) and the second closed circuit (denoted by a solid line) may be separate closed circuits distinguished from each other, and any one of the first and second closed circuits may be operated depending on the switching operation of the switch unit 130.

In the case in which the first closed circuit including the voltage multiplier circuit 151 is operated, a current may be conducted in a forward direction of the multiplier diode Dm to thereby be charged in the balance capacitor Cb. Then, when the switching operation of the switch unit 130 is changed, the second closed circuit may be operated to provide output power Vdrv of the first output unit 150.

The first output unit 150 may alternately operate the first and second closed circuits depending on an alternate switching operation of the switch unit 130, and may stably perform multiplication of output power depending on this alternate operation.

The output switch SW1 may be switched depending on, for instance, but not limited to, a single-ended SSPR scheme.

Again referring to FIG. 2, the second output unit 160 may not include a voltage multiplier circuit. Although one second output unit 160 using the two secondary windings has been illustrated in FIG. 2, this may be only an example. Therefore, the second output unit 160 may be operated by one secondary winding or be configured of three or more of output circuits operated separately from each other.

FIGS. 4A through 4D are graphs illustrating waveforms of the multi-output power supply apparatus according to an exemplary embodiment of the present disclosure.

FIG. 4C is a graph illustrating a current Isec_drv of the first output unit 150 and a current Isec_m of the second output unit 160. As illustrated in FIG. 4C, it may be appreciated that currents of the respective output units may have a stable waveform and interference between the currents of the respective output units may be small. Here, the voltage multiplier circuit is used in the output unit to decrease a leakage inductance.

As a result, according to some embodiments of the present disclosure, a mutual influence of multiple output units may be decreased to stabilize outputs of the respective output units.

As set forth above, according to exemplary embodiments of the present disclosure, even in the case that an output load of any one of multiple outputs is decreased, an influence of variations in the output load on other output loads may be decreased.

According to another exemplary embodiment of the present disclosure, even in the case that a load of image power is decreased, a load of backlight unit power may be stably supplied, such that a dimming control may be more accurately performed.

While exemplary embodiments have been shown and described above, it will be apparent to those skilled in the art that modifications and variations could be made without departing from the scope of the present invention as defined by the appended claims.

What is claimed is:

1. A multi-output power supply apparatus comprising:
   a switch unit performing a switching operation on input power;
   a transformer unit including a primary winding, a first secondary winding and a second secondary winding, the transformer unit transforming the input power to first output power and second output power;
   a first output unit including a voltage multiplier circuit to stabilize power applied to the first secondary winding, and outputting the first output power; and
   a second output unit stabilizing power applied to the second secondary winding and outputting the second output power,
   wherein the first output unit includes:
      a balance capacitor connected in series with one end of the first secondary winding;
      an output switch disposed between the balance capacitor and an output node; and
      a multiplier diode having one end connected between the balance capacitor and the output switch and an other end connected to an other end of the first secondary winding, and
   wherein the first output unit operates at least one of a first closed circuit including the multiplier diode and a second closed circuit including the output switch depending on the switching operation of the switch unit.

2. The multi-output power supply apparatus of claim 1, wherein the transformer unit includes a transformer including:
   the primary winding magnetically coupled to the first and second secondary windings;
   the first secondary winding having a first turns ratio with respect to the primary winding; and
   the second secondary winding having a second turns ratio with respect to the primary winding.

3. The multi-output power supply apparatus of claim 2, wherein the transformer unit further includes a resonant tank including at least one inductor and at least one capacitor.

4. The multi-output power supply apparatus of claim 1, wherein the voltage multiplier circuit comprises the balance capacitor and the multiplier diode.

5. The multi-output power supply apparatus of claim 1, wherein the first output unit supplies the first output power to a backlight unit.

6. A multi-output power supply apparatus comprising:
a switch unit performing a switching operation on input power;
a transformer unit including a primary winding and a plurality of secondary windings, and transforming the input power to first output power and second output power;
a first output unit including a voltage multiplier circuit to stabilize power applied to at least one of the plurality of secondary winding, and outputting first output power; and
a second output unit stabilizing power applied to others of the plurality of secondary windings and outputting the second power,
wherein the first output unit includes:
a balance capacitor connected in series with one end of the first secondary winding;
an output switch disposed between the balance capacitor and an output node; and
a multiplier diode having one end connected between the balance capacitor and the output switch and an other end connected to an other end of the first secondary winding, and
wherein the first output unit operates at least one of a first closed circuit including the multiplier diode and a second closed circuit including the output switch depending on the switching operation of the switch unit.

7. The multi-output power supply apparatus of claim 6, wherein the voltage multiplier circuit comprises the balance capacitor and the multiplier diode.

8. The multi-output power supply apparatus of claim 6, wherein the first output unit supplies the first power to a backlight unit.

9. An output circuit of a multi-output power supply apparatus connected to a secondary winding of a transformer of the multi-output power supply apparatus, the output circuit comprising:
a first closed circuit including the secondary winding of the transformer of the multi-output power supply apparatus and a voltage multiplier circuit; and
a second closed circuit including the secondary winding, an output switch, and an output capacitor,
wherein the first closed circuit further includes:
a balance capacitor connected in series with one end of the secondary winding; and
a multiplier diode having one end connected to an other end of the secondary winding and an other end connected to the balance capacitor, and
wherein the output circuit operates at least one of the first closed circuit and the second closed circuit depending on a switching operation of the multi-output power supply apparatus.

10. The output circuit of the multi-output power supply apparatus of claim 9, wherein the output circuit supplies power to a backlight unit.

* * * * *